United States Patent
Huang et al.

(10) Patent No.: US 8,055,920 B2
(45) Date of Patent: Nov. 8, 2011

(54) COMPUTER SYSTEM

(75) Inventors: Li-Hong Huang, Shanghai (CN);
Yan-Min Wang, Shanghai (CN);
Tsu-Cheng Lin, Taipei (TW)

(73) Assignee: Inventec Corporation, Taipei (TW)

( * ) Notice: Subject to any disclaimer, the term of this patent is extended or adjusted under 35 U.S.C. 154(b) by 445 days.

(21) Appl. No.: 12/421,831

(22) Filed: Apr. 10, 2009

(65) Prior Publication Data

US 2010/0223481 A1    Sep. 2, 2010

(30) Foreign Application Priority Data

Feb. 27, 2009 (TW) .............................. 98106462 A

(51) Int. Cl.
*G06F 15/177* (2006.01)
*G06F 1/30* (2006.01)
*G06F 1/16* (2006.01)

(52) U.S. Cl. ................ 713/300; 713/1; 713/2; 713/310; 713/330; 713/340

(58) Field of Classification Search .................. 713/1, 2, 713/300, 310, 330, 340
See application file for complete search history.

(56) References Cited

U.S. PATENT DOCUMENTS

| | | | | |
|---|---|---|---|---|
| 6,233,693 B1 * | 5/2001 | Berglund et al. | ............. | 713/340 |
| 7,370,220 B1 * | 5/2008 | Nguyen et al. | ................ | 713/330 |
| 7,546,478 B2 * | 6/2009 | Kubo et al. | .................... | 713/330 |
| 7,873,851 B1 * | 1/2011 | Linnell et al. | ................. | 713/330 |
| 2005/0093513 A1 * | 5/2005 | Herbener et al. | ............. | 320/116 |
| 2005/0147237 A1 * | 7/2005 | Mills | ............................ | 379/413 |
| 2007/0059971 A1 * | 3/2007 | LeMay et al. | ................. | 439/403 |
| 2007/0245162 A1 * | 10/2007 | Loffink et al. | ................ | 713/300 |
| 2008/0072090 A1 * | 3/2008 | O'Connor et al. | ............ | 713/330 |
| 2009/0150702 A1 * | 6/2009 | Pickholz et al. | ............. | 713/330 |

FOREIGN PATENT DOCUMENTS

TW    I298576    7/2008

* cited by examiner

*Primary Examiner* — Vincent Tran
(74) *Attorney, Agent, or Firm* — J.C. Patents

(57) ABSTRACT

A computer system including a power supply, a plurality of mainboards, and a power controller is provided. Each of the mainboards corresponds to a standby voltage, respectively. The power supply generates a standby power, and generates a main power according to a power enabling signal. The power controller is coupled between the power supply and the mainboards, for generating the power enabling signal and a control signal according to whether an amount of the mainboards is greater than a predetermined value, and selectively outputting the control signal to at least one of the mainboards. When the mainboards receive the control signal, regardless being in a booting state or a non-booting state, the mainboards receive the main power and converts the main power into a standby voltage corresponding thereto. When failing to receive the control signal, the mainboards convert the standby power into the standby voltage corresponding thereto.

8 Claims, 1 Drawing Sheet

COMPUTER SYSTEM

CROSS-REFERENCE TO RELATED APPLICATION

This application claims the priority benefit of Taiwan application serial no. 98106462, filed Feb. 27, 2009. The entirety of the above-mentioned patent application is hereby incorporated by reference herein and made a part of specification.

BACKGROUND OF THE INVENTION

1. Field of the Invention

The present invention relates to a computer system, and more particularly, to a computer system having a power supply shared by a plurality of mainboards.

2. Description of Related Art

Nowadays, science and technology have been well developed, and are kept developing. Unavoidably, computer systems have become necessary information processing tools which are critical in human daily life. A current computer system may satisfy almost all requirements in working, travelling, and entertainment which are personally demanded by the user. For example, personal information such as personal financial data, banking accounts and passwords, confidential documents and photographs, private letters, and intellectual creations can be saved and managed in a hard drive of the computer system.

In many cases, when using a computer system, the user may temporarily leave the computer system, and therefore the power supply of the computer system will become less efficient. Accordingly, a computer system is often provided with a power supply management mechanism for adaptively turning off some specific electronic units in the computer system, thus lowering the power consumption. In accordance with a typical power supply management mechanism, the computer system usually includes a power supply which provides two kinds of powers, main power and standby power. The main power is provided to the mainboard only when the computer system is in a booting state, while the standby power is provided to the mainboard when the mainboard is electrically connected to the power supply.

Unfortunately, in many times, the mainboard demands more than the standby power which can be provided by the power supply, so that electronic units which are usually driven by the standby power may correspondingly fail to be normally operated. As such, the operation performance of the computer system is impaired. Even though a stronger power supply can be provided for substitution for enhancing the operation performance of the computer system, this inevitably increases the hardware cost and causes a lower resource utilization efficiency.

SUMMARY OF THE INVENTION

Accordingly, the present invention is directed to provide a computer system including a plurality of mainboards. The computer system is adapted for controlling some of the mainboards to convert a main power into a plurality of standby voltages when an amount of the mainboards is greater than a predetermined value.

The present invention provides a computer system. The computer system includes a power supply, a plurality of mainboards, and a power controller. Each of the mainboards corresponds to a standby voltage, respectively. The power supply is adapted for generating a standby power, and generating a main power according to a power enabling signal. The power controller is coupled between the power supply and the mainboards, for generating the power enabling signal and a control signal according to whether an amount of the mainboards is greater than a predetermined value, and selectively outputting the control signal to at least one of the mainboards. When the mainboards receive the control signal, regardless being in a booting state or a non-booting state, the mainboards receive the main power and converts the main power into a standby voltage corresponding thereto. When failing to receive the control signal, the mainboards convert the standby power into the standby voltage corresponding thereto.

According to an embodiment of the present invention, the power supply generates a power ready signal according to the power enabling signal. When receiving the power ready signal, the mainboards convert the main power into a standby voltage corresponding thereto. Further, the mainboards output a mainboard power starting signal and therefore. The power controller generates the power enabling signal according to the mainboard power starting signal. The power controller determines whether the mainboards are in the booting state according to the mainboard power starting signal generated by the mainboards, and when the mainboards is determined as in the booting state, the received power ready signal is transmitted to the mainboards.

According to an embodiment of the present invention, the mainboards outputs mainboard identification codes to the power controller, and the power controller counts the amount of the mainboards according to the mainboard identification codes.

According to an embodiment of the present invention, the mainboards each includes a voltage converter for converting the main power or the standby power corresponding thereto into a plurality of standby voltages.

According to an embodiment of the present invention, the predetermined value is determined according to a mainboard standby driving amount of the standby power.

According to an embodiment of the present invention, the power controller is a complex programmable logic device (CPLD) or a programmable interrupt controller (PIC).

Accordingly, in accordance with the computer system of the present invention, when the amount of mainboards is greater than the predetermined value, the power controller generates the power enabling signal and the control signal. When receiving the power enabling signal, the power supply generates the main power. When receiving the control signal, the mainboards convert the main power into a plurality of standby voltages. In such a way, some of the mainboards can be dynamically selected for converting the main power into a plurality of standby voltages, thus avoiding system operation failures due to that the standby power is incapable of driving all of the mainboards.

BRIEF DESCRIPTION OF THE DRAWING

The accompanying drawing is included to provide a further understanding of the invention, and is incorporated in and constitutes a part of this specification. The drawing illustrates embodiments of the invention and, together with the description, serves to explain the principles of the invention.

DESCRIPTION OF THE EMBODIMENTS

Figure 1:
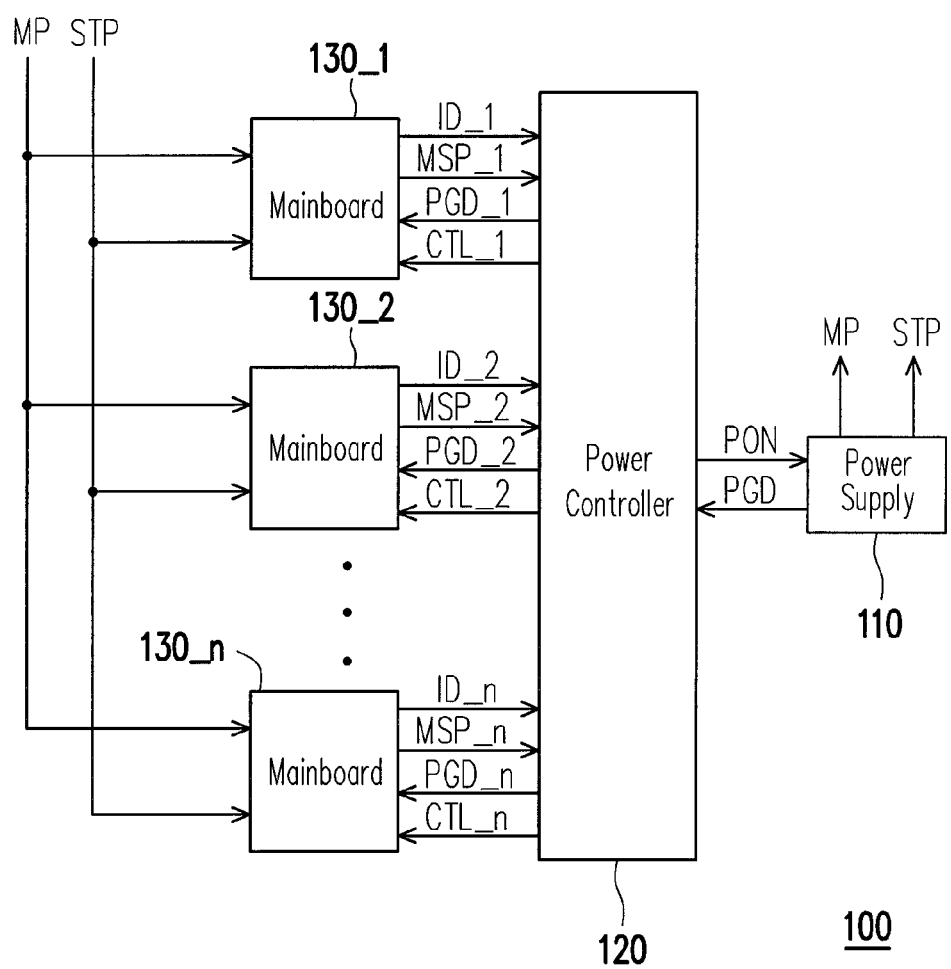
FIG. 1 is a schematic diagram illustrating a computer system according to an embodiment of the present invention.

Reference will now be made in detail to the present preferred embodiments of the invention, examples of which are illustrated in the accompanying drawing. Wherever possible, the same reference numbers are used in the drawing and the description to refer to the same or like parts.

FIG. 1 is a schematic diagram illustrating a computer system according to an embodiment of the present invention. Referring to FIG. 1, a computer system 100 is shown. The computer system 100 includes a power supply 110, a power controller 120, and mainboards 130_1 through 130_n, where n is a positive integer and may be different in accordance with the practical design of the computer system and requirement of clients. The power supply 110 is coupled to the power controller 120 and the mainboards 130_1 through 130_n. When the mainboards 130_1 through 130_n are in a non-booting state, the power supply 110 generates a standby power STP, and the mainboards 130_1 through 130_n convert the standby power STP into a plurality of standby voltages corresponding to the mainboards 130_1 through 130_n, respectively. Preferably, the mainboards 130_1 through 130_n include voltage converters (not shown in the drawing) for converting the standby power STP into a plurality of standby voltages.

Generally, the power supply 110 can be coupled to a power back-plane (not shown in the drawing), through which powers (e.g., standby power STP or main power MP) generated by the power supply 110 can be provided to the mainboards 130_1 through 130_n, respectively. The power controller 120 can be disposed on the power back-plane. When the mainboards 130_1 through 130_n are sequentially connected to the power back-plane, the mainboards 130_1 through 130_n receive the standby power STP. Therefore, the mainboards 130_1 through 130_n respectively transmit corresponding mainboard identification codes ID_1 through ID_n to the power controller 120. After receiving the mainboard identification codes ID_1 through ID_n, the power controller 120 can obtains the amount of the mainboards 130_1 through 130_n by counting the mainboard identification codes ID_1 through ID_n.

The standby power STP provided by the power supply 110 is usually a power with a low current. When the mainboards 130_1 through 130_n of the computer system are in a standby state or the non-booting state, the standby power STP can provide standby voltages required for driving electronic components of the mainboards 130_1 through 130_n. However, when the amount of the mainboards 130_1 through 130_n increases, a higher current is desired for the standby power. The amount of the mainboards 130_1 through 130_n may exceeds a specific amount of mainboards (mainboard standby driving amount hereinafter) which can be driven by the standby power STP when the mainboards 130_1 through 130_n are in the standby state or the non-booting state. In this case, the electronic components of some of the mainboards 130_1 through 130_n driven by the standby power STP may be caused of failures of normal operation, or even the mainboards 130_1 through 130_n may fail of booting.

As such, according to the present invention, when the power controller 120 obtains the amount of the mainboards 130_1 through 130_n, the amount will be compared with a predetermined value. The predetermined value can be equal to or smaller than the mainboard standby driving amount. When the amount is not greater than the predetermined value, that represents the standby power STP is capable of driving all of the mainboards 130_1 through 130_n, and therefore the power controller 120 takes no action in response. When the amount is greater than the predetermined value, that represents the standby power STP is incapable of driving all of the mainboards 130_1 through 130_n by itself. In this case, additional power must be provided by the power controller 120 for substituting the standby power STP for providing to some of the mainboards 130_1 through 130_n, thus allowing all of the mainboards 130_1 through 130_n to be driven as usual. In this case, the power controller 120 generates a power enabling signal PON and transmits the power enabling signal PON to the power supply 110. After receiving the power enabling signal PON, the power supply 130 generates the main power MP, and when the main power is readily prepared, the power supply 130 generates a power ready signal PGD. When receiving the power ready signal PGD, the power controller 120 generates a control signal, e.g., CTL_1, and transmits the control signal to at least one of the mainboard 130_1 through 130_n.

Then, the mainboard 130_1 is taken as an example for illustrating the computer system of the present invention. When receiving the control signal CTL_1 generated by the power controller 120, regardless the mainboard 130_1 is in a booting state, the non-booting state, or the standby state, the mainboard 130_1 receives the main power MP outputted from the power supply 110, and converts the main power MP into a standby voltage. Facilitated with the standby voltage converted from the main power MP, those electronic components driven by the standby power STP can be normally operated. The standby power STP and the main power MP have a same voltage level, and therefore the mainboard 130_1 can utilize the voltage converter (not shown in the drawing) to convert the main power into the standby voltages. Similarly, when receiving control signals, e.g., CTL_2 through CTL_n, the mainboards 130_2 through 130_n take similar actions, and are not to be iterated hereby.

Further, the quantity of the control signals transmitted to the mainboards 130_1 through 130_n is determined by a difference between the amount of the mainboards 130_1 through 130_n and the mainboard standby driving amount. For example, when the amount of the mainboards is 7, and the mainboard standby driving amount is 4, there are 3 mainboards receiving the control signals. These 3 mainboards convert the main power MP into standby voltages for allowing these 3 mainboards to be normally driven. Preferably, the mainboards to which the control signals are to be transmitted can be selected from mainboards which are more frequently booted. In such a way, driving failures caused by too many mainboards can be avoided. Further selecting to transmit the control signals to those frequently booted mainboards is helpful for reducing the switching frequency of the mainboards switching between converting the main power MP and converting the standby power STP into a plurality of standby voltages, thus extending the lifespan of the switch component.

Further, the power controller 120 is adapted for isolating respective signals of the mainboards 130_1 through 130_n. Here, the condition that the amount of the mainboards 130_1 through 130_n is not greater than the mainboard standby driving amount is taken as an example for illustration. According to this condition, the standby power STP is capable of driving all of the mainboards 130_1 through 130_n. Therefore, when all of the mainboards 130_1 through 130_n are in the non-booting state or the standby state, each of the mainboards 130_1 through 130_n receives the standby power STP and converts the received standby power STP into a standby voltage corresponding thereto. When the mainboard 130_1 is in the booting state, the mainboard 130_1 outputs a mainboard power starting signal MSP_1. When the power controller 120 receives the mainboard power starting signal MSP_1, the power controller 120 generates the power enabling signal PON. When the power supply 110 receives the power enabling signal PON, the power supply 110 generates the main power MP, and when the main power is readily prepared, the power supply 110 generates the power ready signal PGD. After receiving the power ready signal PGD, the power controller 120 transmits the power ready signal PGD, e.g., PDG_1, to the mainboard 130_1. After receiving the power ready signal PGD_1, the mainboard 130_1 starts to execute a booting operation for operating the mainboard 130_1. In this case, the mainboard 130_1 is in a booting state, in which the standby voltage of the mainboard 130_1 is provided by the main power MP of the power supply 110. As such, the mainboards 130_2 through 130_n are unaffected by the starting of the mainboard 130_1.

Then, when the mainboard 130_2 is started to be in the booting state, the mainboard 130_2 transmits a mainboard power starting signal MSP_2 to the power controller 120. Meantime, since the main power MP of the power supply 110 and the power ready signal PGD have been already generated, the power controller 120 directly transmits the power ready signal PGD, e.g., PGD_2 to the mainboard 130_2. After receiving the power ready signal PGD_2, the mainboard 130_2 starts to execute a booting operation for operating the mainboard 130_2. In this case, the booting operation of the mainboard 130_2 does not affect the rest mainboards 130_1, 130_3 through 130_n. Likewise, starting operations of other mainboards, e.g., 130_n, can be analogically learnt by referring to the foregoing depiction, and are not to be iterated hereby. Further, it should be noted that the sequence of starting the mainboards as depicted above is exemplified for illustration only, and is not provided for restricting the scope of the present invention.

Further, when the amount of the mainboards 130_1 through 130_n is greater than the mainboard standby driving amount, the power controller 120 directly generates the power enabling signal PON to enable the power supply 110 to generates the main power MP and the power ready signal PGD. In this case, when the mainboard 130_1 is started to be in the booting state, the mainboard 130_1 transmits the mainboard power starting signal MSP_1 to the power controller 120. The power controller 120 then transmits the power ready signal PGD_1 to the mainboard 130_1, so that the mainboard 130_1 starts to execute a booting operation for operating the mainboard 130_1. As to the rest mainboards, e.g., mainboards 130_2 through 130_n, when they are started to be in the booting state, the operations thereof are similar to the mainboard 130_1 as discussed above and can be learnt by referring to the depiction above, and are not to be iterated hereby. It should be noted that with respect to any of the mainboards 130_1 through 130_n, if it converts the standby power STP into the standby voltage when it is in the non-booting state or the standby state, then it converts the main power MP into the standby voltage when it is in the booting state. In such a way, the power controller is provided for preventing interference generated between different mainboards, thus avoiding misoperation of the mainboards.

Further, the power controller 120 for example can be a complex programmable logic device (CPLD) or a programmable interrupt controller (PIC). Therefore, a simplified circuit design can be achieved, and the cost for constructing the circuit can be saved.

Briefly, the present invention provides a computer system as illustrated in accordance with the embodiment. When the amount of the mainboards is greater than a predetermined value, a power enabling signal and a control signal are generated. When the power supply receives the power enabling signal, it generates the main power. When receiving the control signal, the mainboards convert the main power into standby voltages corresponding thereto. In such a way, the computer system of the present invention is adapted for dynamically selecting some of the mainboards for converting the main power into a plurality of standby voltages, thus avoiding system operation failures due to that the standby power is incapable of driving all of the mainboards. Further, the power controller can be a CPLD or a PIC so as to simplify the circuit design and save the cost of constructing the circuit.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer system, comprising:
   a power supply, adapted for generating a standby power, and generating a main power according to a power enabling signal;
   a plurality of mainboards, each corresponding to a standby voltage; and
   a power controller, coupled between the power supply and the mainboards, for generating the power enabling signal and a control signal according to whether an amount of the mainboards is greater than a predetermined value, and selectively outputting the control signal to at least one of the mainboards,
   wherein when the mainboards receive the control signal, regardless being in a booting state or a non-booting state, the mainboards receive the main power and converts the main power into a standby voltage corresponding thereto, and when failing to receive the control signal, the mainboards convert the standby power into the standby voltage corresponding thereto.

2. The computer system according to claim 1, wherein the power supply generates a power ready signal according to the power enabling signal, and when receiving the power ready signal, the mainboards convert the main power into the standby voltage corresponding thereto.

3. The computer system according to claim 2, wherein the mainboards output a mainboard power starting signal and therefore, the power controller generates the power enabling signal according to the mainboard power starting signal, and determines whether the mainboards are in the booting state according to the mainboard power starting signal for transmitting the received power ready signal to the mainboards in the booting state.

4. The computer system according to claim 1, wherein the mainboards are adapted for outputting a plurality of mainboard identification codes, respectively.

5. The computer system according to claim 4, wherein the power controller counts the amount of the mainboards according to the mainboard identification codes.

6. The computer system according to claim 1, wherein the mainboards each comprises a voltage converter for converting the main power or the standby power corresponding thereto into a plurality of standby voltages.

7. The computer system according to claim 1, wherein the predetermined value is determined according to a mainboard standby driving amount of the standby power.

8. The computer system according to claim 1, wherein the power controller is a complex programmable logic device (CPLD) or a programmable interrupt controller (PIC).

* * * * *